April 7, 1931. I. V. BRUMBAUGH 1,800,052

OVEN LINING AND RACK SUPPORTED THEREBY

Filed Aug. 22, 1929 4 Sheets-Sheet 1

Inventor
I. V. Brumbaugh
By Pattison Wright & Pattison
Attorneys

April 7, 1931.   I. V. BRUMBAUGH   1,800,052
OVEN LINING AND RACK SUPPORTED THEREBY
Filed Aug. 22, 1929   4 Sheets-Sheet 2

Inventor
I. V. Brumbaugh.
By Pattison Wright & Pattison
Attorneys

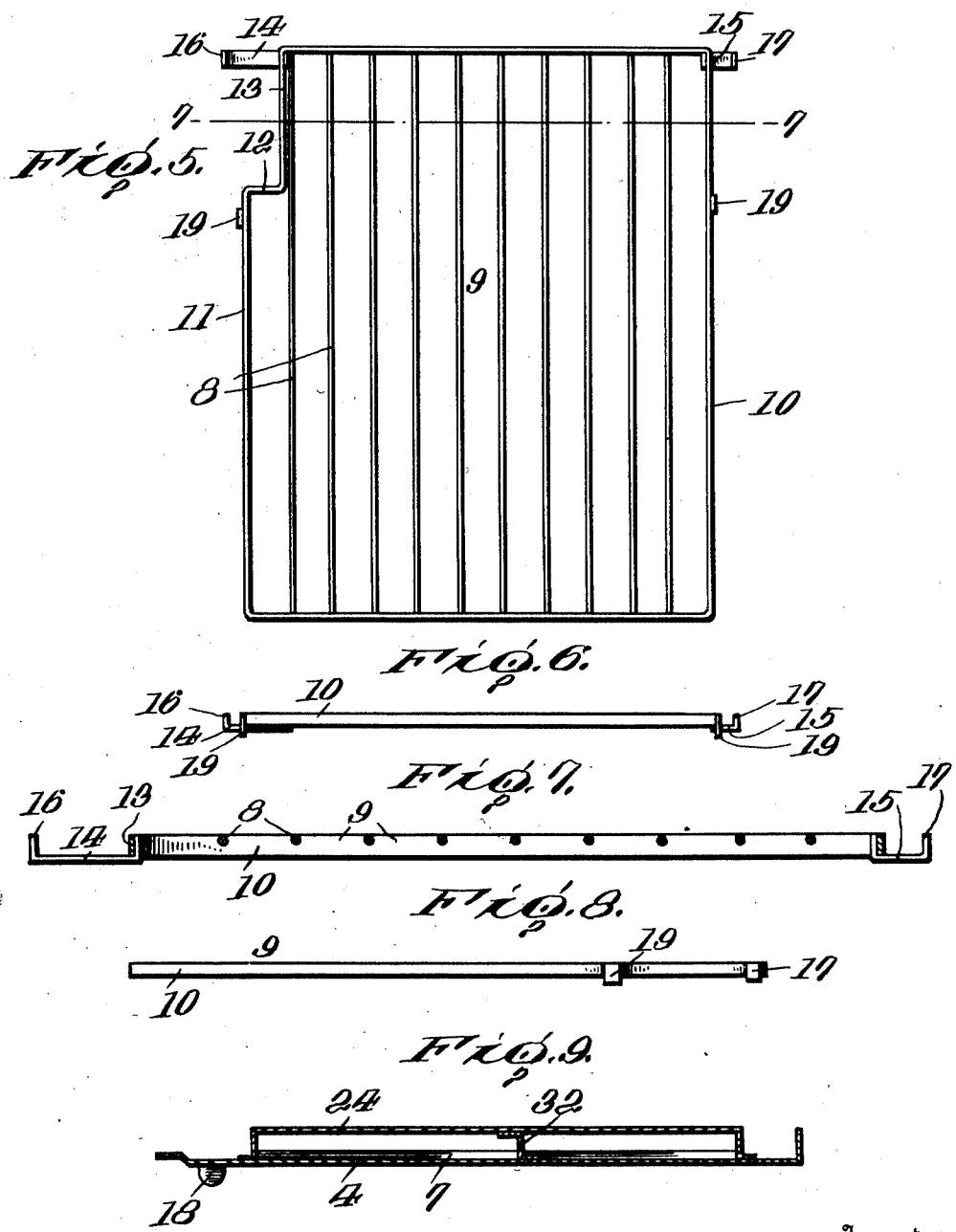

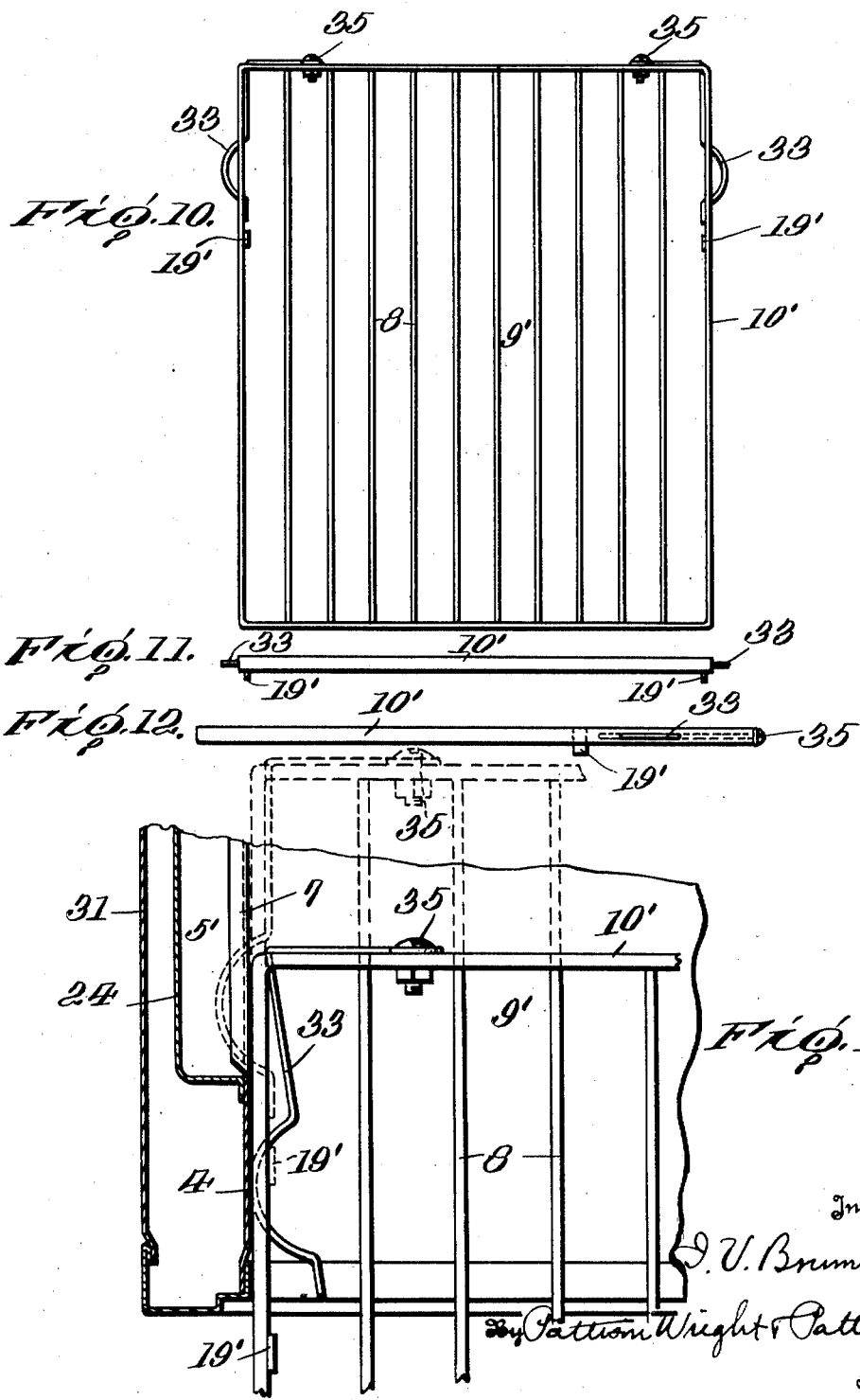

Patented Apr. 7, 1931

1,800,052

UNITED STATES PATENT OFFICE

ISAAC VERNON BRUMBAUGH, OF ST. LOUIS, MISSOURI, ASSIGNOR TO AMERICAN STOVE COMPANY, OF ST. LOUIS, MISSOURI, A CORPORATION OF MISSOURI

OVEN LINING AND RACK SUPPORTED THEREBY

Application filed August 22, 1929. Serial No. 387,711.

This invention relates to certain improvements in oven linings and racks supported thereby and the primary object of the invention is to obviate the use of the usual parallel rack supports which extend into the oven from the lining and extend inward and project longitudinal of the lining, whereby increased space is available in the oven and the accumulation of unsanitary substances on the said supports is avoided, and whereby the inside lining is smooth, easily cleaned and more sanitary than the old inwardly and longitudinally projecting rack supports.

The present improvement involves providing the inner oven lining with a plurality of slots and the racks whereby part of the racks project into the slots and are supported by the longitudinal walls of the slots.

A further object of the present invention is to provide a passageway between the inner lining of the oven and an outer wall of the flue-way that communicates with the said slots whereby the hot gases in the said space will flow into the oven which causes the slots to perform the double function of supports for the racks and as passageways for hot gases from the vertically extending flue.

A further object of the present invention is specially constructing the racks whereby they cooperate with the walls of the slots and are supported by the said walls even when the rack is projecting outside of the oven to receive utensils containing food, or when the racks are pulled outward for examining the food in the utensils and without any liability of tilting and thus spilling the contents of the utensils.

Other objects of the invention will appear from the following detailed description.

In the drawings:

Figure 5 is a plan view of one of the improved racks.

Figure 6 is an end view of Figure 5.

Figure 7 is an enlarged cross sectional view on the line 7—7 of Figure 5.

Figure 8 is an edge elevation of the rack shown in Figure 5.

Figure 9 is a horizontal sectional view on the line 9—9 of Figure 3.

Figure 10 is a plan view of a rack showing a modification in this construction.

Figure 11 is an end elevation of Figure 10.

Figure 12 is a side elevation of Figure 10.

Figure 13 is an enlarged plan view showing part of the rack shown in Figure 10, and part of the lining of the oven.

Figure 1:
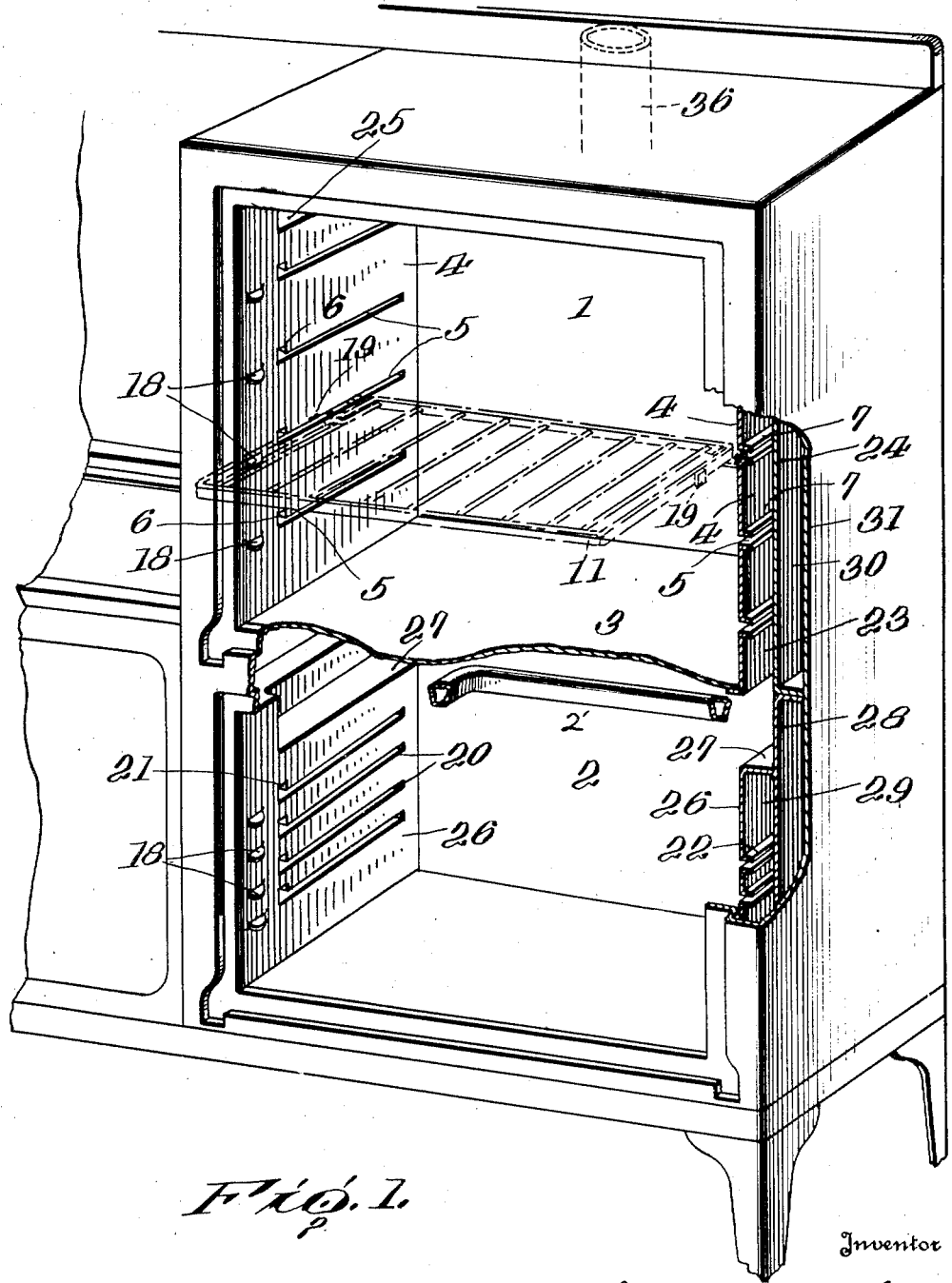
Figure 1 is a perspective view of that part of the range including the cooking and broiling ovens, with the doors omitted therefrom and partly shown in section.

In the accompanying drawings, 1 is a cooking oven and 2 a broiling oven therebelow, the two ovens as here shown being separated by a horizontal wall 3. It is well understood by those skilled in the art that a burner (2' Fig. 1) for heating the cooking oven 1 and for broiling in the broiling oven 2 is located just below the horizontal wall 3 that divides the two ovens.

The inside lining 4 in this improved construction is provided with a plurality of parallel slots 5 that extend longitudinal the said oven. The forward ends of these slots are provided with upwardly extending short slots 6. In forming these slots 5 in the lining 4 a longitudinal slit is made intermediate the walls of the slot and then the walls are bent laterally outward as shown at 7. These upwardly extending slots 6 and the laterally extending flanges 7 cooperate with the special form of rack, which will be now described.

It will be observed from the drawings that the racks 9 are usually composed of a plurality of wires 8 that extend longitudinally the oven and the rack has a surrounding vertically arranged flange 10 which the ends of the rods enter while the side walls of the flange 10 are shown at 11. This surrounding flange may be formed of a rod corresponding to the rods 8 and the ends of the rods 8 attached in any suitable manner to the surrounding rod or wires. However, for the purposes of this present improvement I preferably form the surrounding portion of the rack of what I term as a flange 10 and this flange extends vertically.

Figure 2:
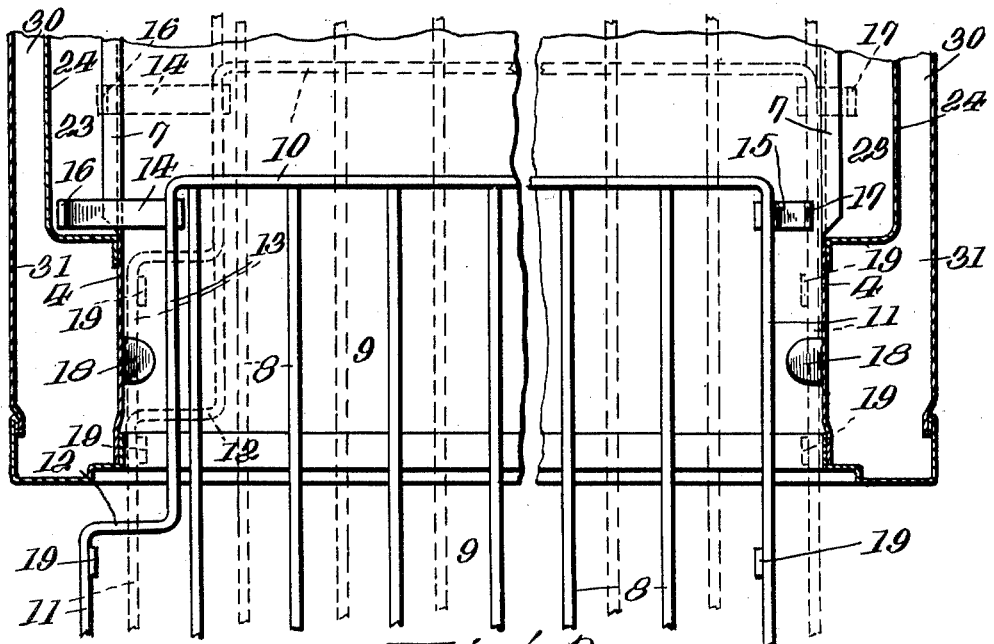
Figure 2 is a partial horizontal sectional view of the oven shown in Figure 1 and also showing the construction of the racks whereby they may be inserted within the oven and removed from the oven by a certain manipulation of the racks.
Figure 3:
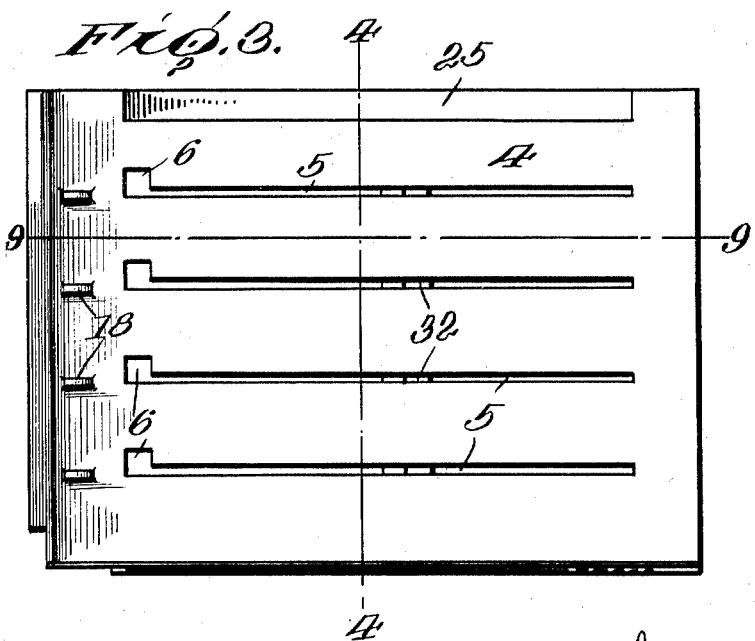
Figure 3 is an elevation looking from the inside of the oven showing the construction of one of the inside linings of the cooking oven.

By reference particularly to Figure 2 it will be observed that the inner end of the rack is made narrower than its outer end and this is accomplished by bending inwardly the surrounding flange 11 as at 12 and then rearward as at 13, the rear end being a part of the flange 10. Attached to this narrowed inner end of the rack is a member 14 preferably made of flat material, and this member projects outwardly from the rack to a position which is beyond a longitudinal line drawn from the flange 11 that is located on the same side as the member 14. Located at the opposite side of the inner end of the rack 9 is a member 15 constructed similar to the member 14 but very much shorter than the said member 14. These members 14 and 15 are attached to the flange 11 and 13 preferably by being spot welded to it.

When the rack 9 is to be placed in the oven it is placed at an angle to the said oven and the long member 14 is entered in one of the vertical slots 6 and then the rack moved laterally in the position shown in Figure 2 until the member 15 is opposite a corresponding vertical slot 6 and then the rack 9 is moved to carry the outer end of the member 15 into the vertical slot. With both the members 14 and 15 in the said slots 5 the rack is held in that position by reason of the upturned ends 16 and 17 which will prevent the rack from being moved so as to disengage the members 14 and 15 from the said slots. Again when the rack is pushed in the oven sufficiently far to cause the outer wide portion to enter the said oven then it is not practical to cause the disengagement of the members 14 and 15 with the walls of the slots 5. From the foregoing description it will be observed that the members 14 and 15 form supports for the inner end of the rack, and when the rack is pushed in a little farther then it is held in a horizontal position by having the longitudinal portion 11 rest on the supports 18. These supports perform a further function. That is to say, they serve as stops to prevent the rack from being moved outward by reason of the depending members 19 which are normally in rear of the supports 18. These members 19 project slightly below the part 11 so that they engage the members 18 and when placing the rack within the oven it is necessary that the front end of the rack be lifted just sufficiently to permit these stops 19 to be elevated above the combined supports and cooperating stops 18.

scription that when the rack is in position within the oven and in normal position it cannot be accidentally removed from the oven so that it can be pulled out to its limit and it will stop, and when pulled out it can contain utensils containing food for inspection or otherwise without any danger of tilting and spilling the contents of the utensils. When it is desired to remove the rack from the oven it is only necessary to lift the outer wide end of it until the depending stops 19 escape the combined support and stops 18 and then the racks can move to the position shown in full lines in Figure 2, which will enable the racks to be removed.

Attention is directed to the relatively narrow outwardly extending flanges 7 which are made preferably as an integral with the inner lining 4. These flanges are narrower than the space between the upturned end of the member 15 and the rack 11 which permits the rack to be moved backward and forward smoothly and easily. When the rack is in position within the oven then the upturned end 16 of the longer member 14 is in relatively the same position as the upturned end 17 of the member 15.

Primarily the object of providing the slots with the upturned flanges 7 is to accomplish a double function, viz. to strengthen the said lining and to secondly, prevent the lining from warping when the same is being enameled. It is well known and it is common now to enamel the inner lining of ovens and it is necessary that the oven be strengthened and prevented from warping in order that it may properly be enameled without being warped and thrown out of line so as to interfere with the space of the oven and interfere with the movement of the rack within the oven.

The broiling oven 2 is provided with a plurality of slots 20, the said slots having their front ends extending vertically as at 21 and the edges of the slots provided with outwardly extending flanges 22 similar to the flanges 7 of the baking oven. This construction is to enable the same form of rack to be used in the broiling oven as is used in the cooking oven, which has been already described and it is needless to repeat it in connection with the broiling oven.

Attention is directed to the space 23 (shown clearly in Figure 2) which lies between the inner lining 4 of the oven and the outer wall 24 of the oven. This space is primarily for the purpose of forming a flue for the passage of the hot gases, and it will be observed that the slots of the oven lining communicate with these vertically arranged flues.

It will be understood that the air required for combustion enters the broiler compartment through the slots 20 and that the hot the flue 23 formed between the lining 4 and the outer wall 24. It is usually necessary in order to obtain equal distribution of heat in an oven to provide more openings in the upper portion of the oven lining than in the lower portion for the entrance of hot gases and for this purpose I provide near the top of the oven an enlarged opening or slot 25.

Figure 4:
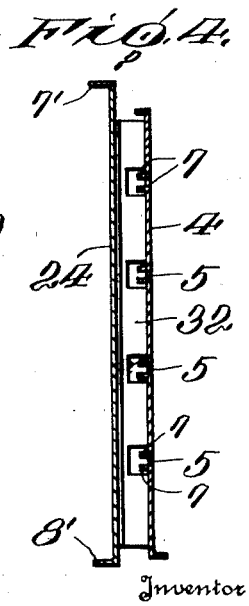
Figure 4 is a vertical sectional view on the line 4—4 of Figure 3.

Attention is directed to the lining 26 of the broiler oven and particularly to the fact that the upper end 27 of this lining is bent outward against the wall 28 whereby up-flowing air through the space 29 from its lower end is obliged to flow into the broiling oven to furnish the proper amount of air for combustion of the burner therein and that the hot gases therein then flow into the space 23 that is formed between the cooking oven lining 4 and the outer walls 24 and from thence through the slots 5 and the enlarged opening 25 into the cooking oven. It will be understood by those skilled in the art that the products of combustion from the oven broiler finally find their way to an ordinary flue 37 (when required) located at the rear of the oven, and thence escape through the chimney to which the flue may be connected. The space 30 located between the outer wall of the ovens and the outer wall of the range 31 forms substantially an insulation. In some instances this space may be filled with non-conducting material such as asbestos (not shown) and the like. This space 30 is formed by the flanges 7' and 8' shown in Figure 4.

For further stiffening the walls 24 and the lining 4, the said walls are united by a suitably shaped member 32 which is welded to the walls for the purpose of strengthening them and for the purpose of preventing warping of the walls when enameling. It will be understood that in Figure 9 there is shown only the oven lining 4 and the outer flue wall 24. The parts 4, 24 and 32 are preferably welded together as a unit, before enameling.

In Figures 10, 11, 12 and 13 I show a modification of the rack construction. In these figures the rack is made of the same width throughout and the inner end of the rack is provided with spring members 33 that move through the slots 34 formed in the flange member 10' that surrounds the rods 8'. These spring members when placing the rack 9' in position are forced inwardly as shown in Figure 13 until the spring reaches the slot 5' when it will then move outward therein. These springs serve to support the inner end of the rack and the rack is provided near the outer ends of the springs with stop members 19' which engage with the members 18 to prevent the rack from being accidentally withrawn from the oven. It will be observed in the construction of Figures 10 to 13 inclusive that it is unnecessary for the rack to be moved laterally when being placed in the oven or removed from the oven. However, I prefer to use the construction shown in Figures 2 and 5. The rear ends of the springs 33 are firmly bolted to the rack 9' by suitable bolts 35.

The flue for the products of combustion communicates with a flue outlet 36, Figure 1.

The present improvement has been herein shown and described in considerable detail, but I wish it understood that the construction may be varied without departing from the spirit and scope of the invention so long as the modifications are within a liberal construction of the appended claims.

Having thus described my invention what I claim and desire to secure by Letters Patent is:

1. A gas range having an oven provided with a lining, said lining having a plurality of longitudinally extending slots, a rack carrying at opposite sides of its rear portion projections which extend beyond the width of the rack to enter the said slots and an oven having at opposite sides of its front portions inwardly extending supports upon which the rack rests and is held against tilting.

2. A range having an oven provided with a lining, said lining provided with longitudinally extending slots, a rack carrying at its rear portion projections extending laterally beyond the width of the rack and entering the said slots, the front portions of the lining having inwardly extending projections upon which the front portion of the rack is supported, the parts adapted to be operated in the manner set forth.

3. A range having an oven provided at its opposite walls with longitudinally extending slots, a rack having one side of its rear portion made narrower, the narrowed portion and the opposite side of the rack provided with projections extending beyond the widest portion of the rack and adapted to enter the said slots and the opposite sides of the lining in advance of the front ends of the slots provided with inwardly extending supports upon which the front portion of the rack is supported, for the purpose specified.

4. A range having an oven provided with a lining, said lining having longitudinally extending slots having their front ends projecting upwardly, a rack of substantially the same width as the oven, said rack having one side of its rear end narrowed, the rack having its narrowed portion provided with a projection extending beyond the greatest width of the rack, said projection having laterally turned ends, the said lining having a supporting projection located in front of the front ends of the slots, said construction operating as set forth.

5. A range having an oven provided with a lining, said lining provided with longitudinally extending slots, the upper and lower walls of the slots having inwardly extending strengthening flanges for the purpose set forth, and a rack within the oven having its rear portion provided with projections extending beyond the rack's width and entering the said slots, the ends of the projections having laterally extending portions located sufficiently beyond the sides of the rack to accommodate the flanges of the slots, the parts adapted to operate for the purpose set forth.

6. A range having a cooking oven and a broiling oven therebelow, the inner walls of the ovens provided with rack supporting slots, said lining and wall forming therebetween a flue ending at the upper portion of the broiling oven, the slots of the broiling oven communicating with the space between its lining and the said outer wall, thereby forming a flue for the admission of fresh air to support combustion for the burner of the broiling oven, the latter mentioned space having its upper end closed, the parts arranged for the purpose set forth.

7. A range having a cooking oven and a broiling oven therebelow, a burner located in the upper portion of the broiling oven, the ovens having linings, a wall located outside of the said lining and spaced therefrom, said linings having slots communicating with the said space, the said space for the cooking oven ceasing at the upper portion of the broiling oven and having communication therewith, and said space for the broiling oven ceasing at a point below the cooking oven, whereby air for supporting combustion passes through the wall of the broiling oven and the products of combustion and hot gases flow through the said space of the cooking oven, the upper portion of the said space being in communication with the flue outlet, the parts operating for the purpose set forth.

8. A range having a cooking oven and a broiling oven therebelow, the broiling oven having a burner in its upper portion, the linings of the two ovens provided with rack supporting slots, a wall located outside of and spaced from the said linings to form flues, the flue for the broiling oven being closed at the upper portion thereof and the flue for the cooking oven communicating with the upper portion of the broiling oven, said cooking oven having an enlarged opening in its upper portion for the passage of the hot gases, whereby the circulation is proper to establish correct operation.

9. A range having an oven provided with a lining, said lining having longitudinally extending slots and a rack substantially fitting the said lining, said rack having its rear portion provided with means to engage the said slots and the front portion of the lining provided with inwardly extending supporting members, substantially as set forth.

10. A range having an oven provided with a lining, said lining having longitudinally extending slots and a rack substantially fitting between the said linings, the rear portion of the rack having springs normally extending beyond the rack and adapted to enter the said slots and the front portion of the lining having inwardly extending supporting members adapted to support the front portion of the rack, the parts operating in the manner set forth.

11. In a gas range the combination with an oven having a lining provided with a plurality of horizontally arranged elongated slots, and a flat rack narrower than the space between the said lining the rack having at its rear corners narrow projections extending in the said slots, the said projections and said rack being movable throughout the length of the slots whereby the rack is freely movable backward and forward, and means for supporting the front end of the rack as it moves backward and forward whereby the said rack is vertically adjustable in the oven and movable therein.

12. A gas range having an oven provided with a lining having a plurality of elongated horizontally extending slots, and a flat rack of a width fitting within the said oven, the rack having at its rear corners narrow projections extending in the said slots and the lining having supports at its front edge located in a horizontal line with the ends of the slots, the rack vertically adjustable in the oven and freely movable throughout the length of the slots and supported by said projections and supports.

In testimony whereof I hereunto affix my signature.

ISAAC VERNON BRUMBAUGH.